3,164,926
METHOD OF APPLYING GROWTH CONTROL CHEMICALS TO GROWING PLANTS

Myron P. Laughlin, 1705 Beach Drive,
St. Petersburg, Fla.
No Drawing. Original application Apr. 5, 1956, Ser. No. 576,318, now Patent No. 3,002,319, dated Oct. 3, 1961. Divided and this application Feb. 27, 1961, Ser. No. 91,596
5 Claims. (Cl. 47—58)

This invention relates to an improved method of applying plant growth chemicals to growing plants.

It is the special purpose of this invention to provide a method for direct introduction of growth control chemicals into the body structures of massed growing plants, thereby eliminating plant skin absorption losses together with the large percentage of "miss" and "fall off" common to chemical application by spraying, broadcasting and like previous methods.

An equally important object of the herein disclosed invention is to provide methods of massed plant chemical injection which will automatically accomplish all of the beneficial results in field work heretofore practical only in treating individual laboratory specimens laboriously by hand, one at a time; thus placing an unskilled field laborer on a practical work level with laboratory technicians so far as correct chemical quantities, correctly applied, are concerned and at a tremendous advantage in quantitative result.

The particular purpose of this present application is to further disclose preferred methods practiced by the devices disclosed in my pending applications serially numbered 576,318 (now Patent No. 3,002,319) and 614,315 (now Patent No. 2,988,849) entitled "Hand Weed Destroyer" and "Means for Applying Plant Growth Control Chemicals" and to serve as a division and continuation-in-part thereof. Reference may be had to the object and descriptive parts of both such applications for better understanding of the full significance of the invention claimed herein and will prevent needless duplication since the drawings thereof will serve for such purposes of illustration of method practice embodiments as are essential to a full understanding thereof.

This invention may be described in its broadest aspect as selective mass plant vaccination and differentiated from individual plant injection by the prior preparation of plant chemicals in correct area dosage for a given species existing in the area, rather than individual or mere multiplication of single plant treatment, and by the measured correctly directed effect on only selected plants in a growth area containing inter-mixed plants. In other words, this method substitutes field automation for skilled technicians and time consuming hand individual plant handling methods heretofore only practical in laboratories on individual specimens for display purposes.

It will be understood that by reference to growth chemicals herein this applicant discusses growth promoting combinations, such as fertilizers, growth retarding compounds, such as inhibitors, and chemicals which are substantially growth terminators, and that the methods disclosed herein contemplate preselection of chemicals in themselves selective, combined with selective application thereof to increase the efficiency of produced effect and simultaneously decrease the cost of application.

This method contemplates a combination of simple steps which have in a large part been accomplished individually, but which have previously involved high technical skill with such great labor expense that in many cases the more costly growth control chemicals could not be used becaues of the low efficiency of the application methods employed.

My method may perhaps best be described by describing its application to the control of vegetation strips along highways commonly termed "aprons" wherein many acres of grasses in relatively narrow strips must be maintained and kept free of undesired growths, while in elongated marginal contact with crops and private lawns whose cultivation must not be affected, all this at the lowest possible costs per acre, so that public use of longer highways may be possible. Spray methods for such areas, even in windless periods have resulted in "drift" and side effects injurious to property owners, together with costly lawsuits resulting therefrom. Individual hand treatment of grass plants in such areas is obviously impractical because of time and cost. Machine "broadcasting" methods cover whole areas wherein there may be relatively few growths whose treatment is desired and can only dump the chemical on the upper leaf surfaces of the growing plants (with a large part wasted on the ground therebetween). Such dumped chemicals may well fall off entirely, or, if retained long enough, be only partially absorbed through the plant skin. Applied to such highway vegetation control problem: my method in this embodiment defines that a growth control chemical mixture be preselected. In this example perhaps a grass growth promoter (such as a fertilizer) mixed with a weed growth retarder, such as a broad leaf herbicide, may form the mixture and this mixture may then be fed through the skins of preselected growing plants by application on an abrasive applicator with only such force as to penetrate the plant skin, a force not approaching that force which would mechanically destroy the plants. Thus, my method eliminates the "drift" by direct application to the plants by selective application thereto and treats only the desired plants. Thus it wastes no chemical on ground areas between plants, while by introducing the chemical through the plant skin, it eliminates absorption time, evaporation from plant surfaces and fall off.

This applicant is aware that sandblasts, powder explosives, mechanical drags, and the like, have all been used to destroy plants, individually and en masse, but differentiates therefrom in specifically avoiding such destruction, his invention serving in the plant world much as mass inoculation serves in medical service to humans in that his method carefully avoids blasting the patient off the earth to cure a simple dandruff.

It will be manifest that a highly simplified modification of method and of its application to a generalized problem has been used for purposes of illustration and that many other embodiments involving different chemical combinations and selective application thereof will at once suggest themselves to those skilled in the art, all well within the spirit of the appended claims.

What I claim is:

1. The method of feeding chemicals to a multiplicity of growing plants simultaneously during their growth without mechanical destruction thereof which includes preparing the chemicals in multiple dose form, feeding such dosage to a chemical vaccinator, then forcibly feeding the chemicals through the outer skins of said plants via said vaccinator as it passes over said plants to treat the same without mechanical interference with the plant growth therein.

2. The selective method of simultaneously chemically treating a multiplicity of plant growths with plant growth chemicals while said plants are growing and intermixed with other plants not to be so treated in a restricted area hosting all of said plants, which includes preparing the desired chemicals, then feeding said chemicals to an abrasive chemical carrier, then traversing said carrier over the aforesaid area at that constant maintained height which will fully contact the main body parts of the plants to be treated, but which is a greater height than the main body of the other plants abovesaid, so that said carrier abrades the surfaces of the selected plants vaccinating the growth chemicals therein without destruction thereof, thereby affecting faster plant response and greater efficiency for such application.

3. The continuous method of simultaneously applying plant growth control chemicals to selected growing plants of a given species in a plant growth area without substantially affecting other plants of other species in the same area and in areas adjacent thereto which comprises selecting application zones on the first said plants of the selected species, preparing an applicator for the plant growth chemical adapted by its form and mounting to affect only said selected plant's application zones, and supplying continuously the growth control chemicals to the aforesaid applicator as it is passed over the said areas whereby the chemicals are fed by the applicators to the pre-selected zones of the plants in the selected species.

4. The continuous method of applying plant growth control chemicals to plants of mixed species in a restricted area which includes applying growth control chemicals by continuously forced abrasive contact confined within said areas and operated in pre-determined vertical relationship to the plant growths while standing, said continuous application confined to pre-selected plant zones so that plants outside of said area are not treated and plants within said area are treated only in the aforesaid zones.

5. The selective method of treating only plants of a pre-selected species growing intermixed with other plants in a common area which includes determining vulnerable growth zones peculiar to such species as differing from similar zones of said other plants in the same area, providing a mechanical carrier formed to contact only such vulnerable growth zones and to avoid such other plants in the same area, feeding growth control chemicals to such carrier and traversing such carrier over the area.

References Cited in the file of this patent

UNITED STATES PATENTS 2,988,849     Laughlin _____ June 20, 1961

FOREIGN PATENTS 23,902     Australia _____ of 1925
15,892     Australia _____ of 1928
494,341     Germany _____ Mar. 22, 1930
700,353     Great Britain _____ Dec. 2, 1953